(12) United States Patent
Price

(10) Patent No.: US 6,447,294 B1
(45) Date of Patent: Sep. 10, 2002

(54) LOCATOR FOR LOST DENTURES

(76) Inventor: William Raymond Price, 1452 Ridgemere La., Winston-Salem, NC (US) 27106

( * ) Notice: Subject to any disclaimer, the term of this patent is extended or adjusted under 35 U.S.C. 154(b) by 0 days.

(21) Appl. No.: 09/608,926

(22) Filed: Jul. 3, 2000

Related U.S. Application Data

(60) Provisional application No. 60/170,326, filed on Dec. 13, 1999, and provisional application No. 60/176,316, filed on Jan. 18, 2000.

(51) Int. Cl.[7] ............................................... A61C 13/00
(52) U.S. Cl. ..................... 433/167; 433/171; 340/572.1
(58) Field of Search ................................. 433/167, 171, 433/229; 340/551, 572.1, 572.6, 572.8

(56) References Cited

U.S. PATENT DOCUMENTS

| | | | |
|---|---|---|---|
| 3,747,086 A | | 7/1973 | Peterson |
| 3,790,945 A | * | 2/1974 | Fearon |
| 4,095,214 A | | 6/1978 | Minasy |
| 4,262,632 A | | 4/1981 | Hanton et al. |
| 4,439,154 A | | 3/1984 | Mayclin |
| 4,510,489 A | * | 4/1985 | Anderson, III et al. ..... 340/572 |
| 4,510,490 A | | 4/1985 | Anderson, III et al. |
| 4,557,693 A | | 12/1985 | Elggren |
| 4,623,877 A | | 11/1986 | Buckens |
| 4,746,908 A | | 5/1988 | Montean |
| 4,797,101 A | | 1/1989 | Morris |
| 5,029,291 A | * | 7/1991 | Zhou et al. .................. 340/551 |
| 5,037,301 A | | 8/1991 | Michnick et al. |
| 5,041,826 A | | 8/1991 | Milheiser |
| 5,057,095 A | | 10/1991 | Fabian |
| 5,300,120 A | | 4/1994 | Knapp et al. |
| 5,326,349 A | * | 7/1994 | Baraff ........................... 623/9 |
| 5,353,010 A | | 10/1994 | Sanetra |
| 5,495,229 A | | 2/1996 | Balch et al. |
| 5,495,230 A | | 2/1996 | Lian |
| 5,629,677 A | * | 5/1997 | Staino, Jr. .................... 340/568 |
| 5,664,582 A | * | 9/1997 | Szymaitis |
| 5,677,673 A | * | 10/1997 | Kipnis .......................... 340/539 |
| 5,760,692 A | * | 6/1998 | Block .......................... 340/573 |
| 5,801,627 A | * | 9/1998 | Hartung ....................... 340/568 |
| 5,847,649 A | | 12/1998 | Collins et al. |
| 5,855,609 A | | 1/1999 | Knapp |
| 5,867,102 A | * | 2/1999 | Souder et al. ............... 340/572 |
| 5,873,724 A | | 2/1999 | Carucci |
| 5,909,178 A | | 6/1999 | Balch et al. |
| 5,923,001 A | | 7/1999 | Morris et al. |
| 6,026,818 A | | 2/2000 | Blair et al. |
| 6,059,571 A | * | 5/2000 | Kishigami ................... 433/167 |
| 6,084,513 A | * | 7/2000 | Stoffer ...................... 340/572.2 |
| 6,239,705 B1 | * | 5/2001 | Glen ....................... 340/573.1 |

FOREIGN PATENT DOCUMENTS

EP 0 258 415 B1 12/1992

* cited by examiner

Primary Examiner—Ralph A. Lewis

(57) ABSTRACT

A locator or signaling device and a detector system for locating lost dentures includes a button or insert that can be mounted on the surface of an existing denture. An insert can also be implanted in a new denture. The internal signaling component is surrounded by a resin layer that can be used to bond the locator button to the existing denture and will also isolate the internal signaling component form the denture wearer's oral cavity. The internal signaling component is responsive to an electromagnetic field and emits a detectable signal when the denture is located with a specified interrogation zone or search area. Signaling components having magnetic characteristics that are altered by an incident variable electromagnetic field can be employed. The preferred location for the locator, locator strip, marker or button is on the interior lingual surface of the flange of a mandibular or lower denture.

14 Claims, 9 Drawing Sheets

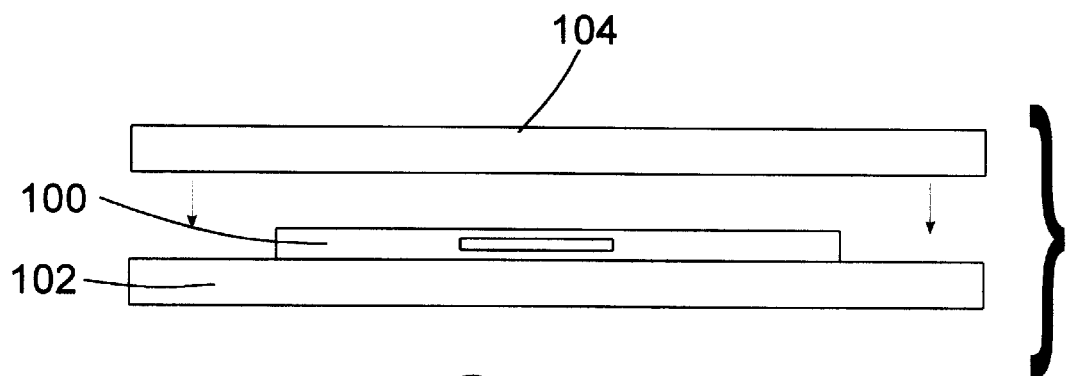
FIG 12A
FIG 12B
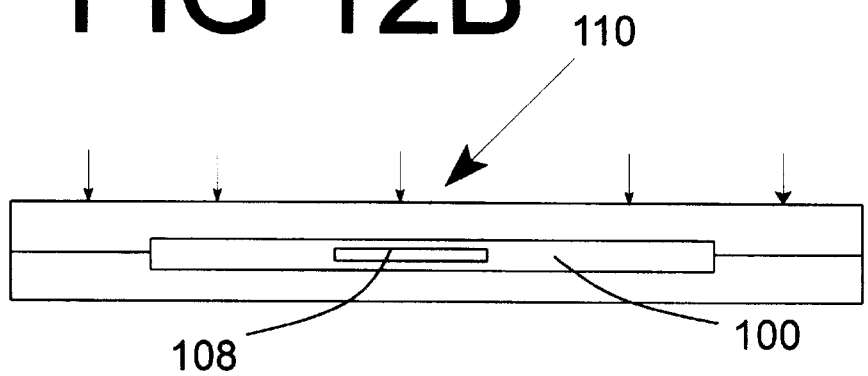
FIG 12C
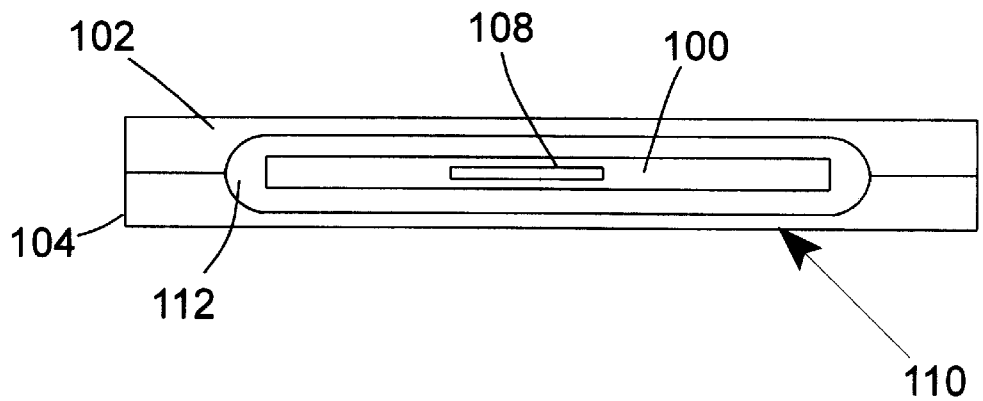

LOCATOR FOR LOST DENTURES

CROSS REFERENCE TO PENDING APPLICATIONS

This application claims the benefit of prior copending Provisional Patent Application No. 60/170,326 filed Dec. 13, 1999 entitled Locator for Lost Dentures and prior copending Provisional Patent Application No. 60/176,316 filed Jan. 18, 2000 entitled Magnetomechanical Element for Locating a Denture.

BACKGROUND OF THE INVENTION

1. Field of the Invention

This invention is related to dentures and to an apparatus and method for locating lost dentures. This invention is also related to a signaling device that can be mounted in existing dentures or incorporated in new dentures and to a detector for locating the signaling device, attached to the lost denture within a certain area or an interrogation zone. The detector area or interrogation zone could be located at a building exit leading to a trash disposal collection area. This device is also related to devices for transmitting an electromagnetic field and detectors for locating a signal generated in response to the electromagnetic field.

2. Description of the Prior Art

Medical institutions and long term care facilities in which patients and residents may suffer from diminished mental capacity or simple forgetfulness frequently have difficulty locating personal articles that have been misplaced or lost. One problem that is often encountered is that the patients or residents tend to lose or misplace their dentures. Patients or residents in such facilities often inadvertently throw their dentures in trash receptacles, leave them in pockets of clothing that is taken to a laundry facility or leave then on serving trays after meals. In rest homes and nursing care facilities, the resident may also place the dentures under sheets, in closets or in drawers where they can be difficult to locate. In some cases, the dentures are subsequently located by the institution's personnel, who cannot identify the owner. In other situations the lost dentures are inadvertently disposed of in the trash or simply cannot be found within a reasonable time.

Although this problem occurs even when the institutions personnel are vigilant, it is especially upsetting to the residents and to their relatives. Lost dentures can be costly to replace, and relatives can be especially upset that the institution cannot keep track of their older relative's dentures. In many cases, the institution must replace the dentures and is not reimbursed.

Medical institutions do encounter problems with lost articles in other contexts. For example, U.S. Pat. No. 5,923,001 discloses a surgical sponge detection system for use in an operating room in which detectable RF tags are attached to the sponges. U.S. Pat. No. 5,664,582 discloses a marker that can be used on a surgical instrument. However, these devices are used only within a controlled environment, and the problem of lost dentures arises because it is not possible to control the environment in which the loss may occur.

U.S. Pat. No. 4,160,971 discloses a passive transponder without a local power supply that is remotely powered by received transmissions. This device is primarily intended to measure pressure on dental plates. However, this device is intended to provide telemetry instead of a locator signal and it does not appear to be adapted for incorporation into denture that would be used for an extended period of time by an ordinary denture wearer. It also does not to be adapted for use with an existing denture.

Implants for use in a prosthesis are shown in U.S. Pat. No. 5,300,609 and in U.S. Pat. No. 5,855,909. However, these devices are also intended for data transmission instead of as a locator, and as such would not have the range to locate lost dentures.

SUMMARY OF THE INVENTION

In accordance with this invention, a dental insert for use in locating a lost artificial denture includes an internal signaling component. The signaling component emits a signal in response to an external electromagnetic field and is embedded in an exterior layer transparent to the external electromagnetic field. The exterior layer is bondable to the denture on at least one side and is suitable for introduction into the oral cavity of a denture wearer without causing irritation to the denture wearer's mouth while at the same time isolating the internal signaling component from the oral cavity and any fluids that might damage the signaling component if subjected to prolonged exposure. In one embodiment, and exterior side of the insert is shaped to conform to the local surface of the denture after the denture has been mounted in a recess in the denture.

A transmitter-detector unit is also employed. An electromagnetic field is transmitted and if the denture is within an interrogation zone, the internal signaling component emits a signal that can be detected by the detector unit. The transmitter-detector can be portable or stationary, and the transmitter and detector can either be in the same unit or in different units.

In a maxillary or upper denture, the signaling device or button can be mounted in the palatal vault area. The thickness of the device should be small so as not to cause irritation to the tongue or to the palate. Preferable the thickness of the signaling button or locator strip should be less than the local thickness of the palatal vault to which the locating button will conform. The signaling device or button may also be located on the interior lingual surface of a maxillary denture, just below the teeth. In the mandibular or lower denture, the locator button can be located on the lingual surface of the denture flange. The signaling device can also be located in a cavity formed in the molar area of either the upper or lower denture.

A resin layer surrounds the internal signaling component. This layer both isolates the signaling device from the denture wearer's mouth or oral cavity and provides a means for bonding the button to the denture.

In a preferred embodiment, the button also includes a visible external indicia or marking that can be used to identify the denture's owner. This visible external indicia could be a serial number, the owner's name or a unique bar code. This information could be stored on an accessible computer data base to permit the health care institution, or any other entity having access to the database, to determine the owner of the lost denture as well as any additional information stored in the database.

Passive locator strips suitable for use in the preferred embodiment of this invention can be o the types shown in the following patents or in devices having similar or equivalent characteristics.

U.S. Pat. No. 3,747,086—Deactivatable Ferromagnetic Marker for Detection of Objects Having Marker Secured Thereto and Method and System of Using Same U.S. Pat. No. 4,510,489—Surveillance System Having Magnetomechanical Marker U.S. Pat. No. 4,660,025—Article Surveillance Magnetic Marker Having an Hysteresis Loop with Large Barkhausen Discontinuities U.S. Pat. No. 5,029,291—Electromagnetic Sensor Element and Methods and Apparatus for Making and Using Same Numerous other patents show similar magnetic sensor elements that respond to an variable external electromagnetic field.

BRIEF DESCRIPTION OF THE DRAWINGS

FIG. 10A shows a roughened face of the insert that will be bonded to the denture. FIG. 10B shows a smooth surface on the opposite side that would be exposed and will conform to the shape of the denture. FIG. 10C is an edge view of the denture showing a shape that would correspond to the shape of a portion of the denture.

FIGS. 12A–C show the steps in forming a signaling or locating device using a magnetomechanical or magnetostrictive sensor element embedded in resin outer layers in which a gap or channel is formed between the sensor element and the resin layers by volumetric contraction of the resin as it solidifies.

DETAILED DESCRIPTION OF THE PREFERRED EMBODIMENT

Figure 1:
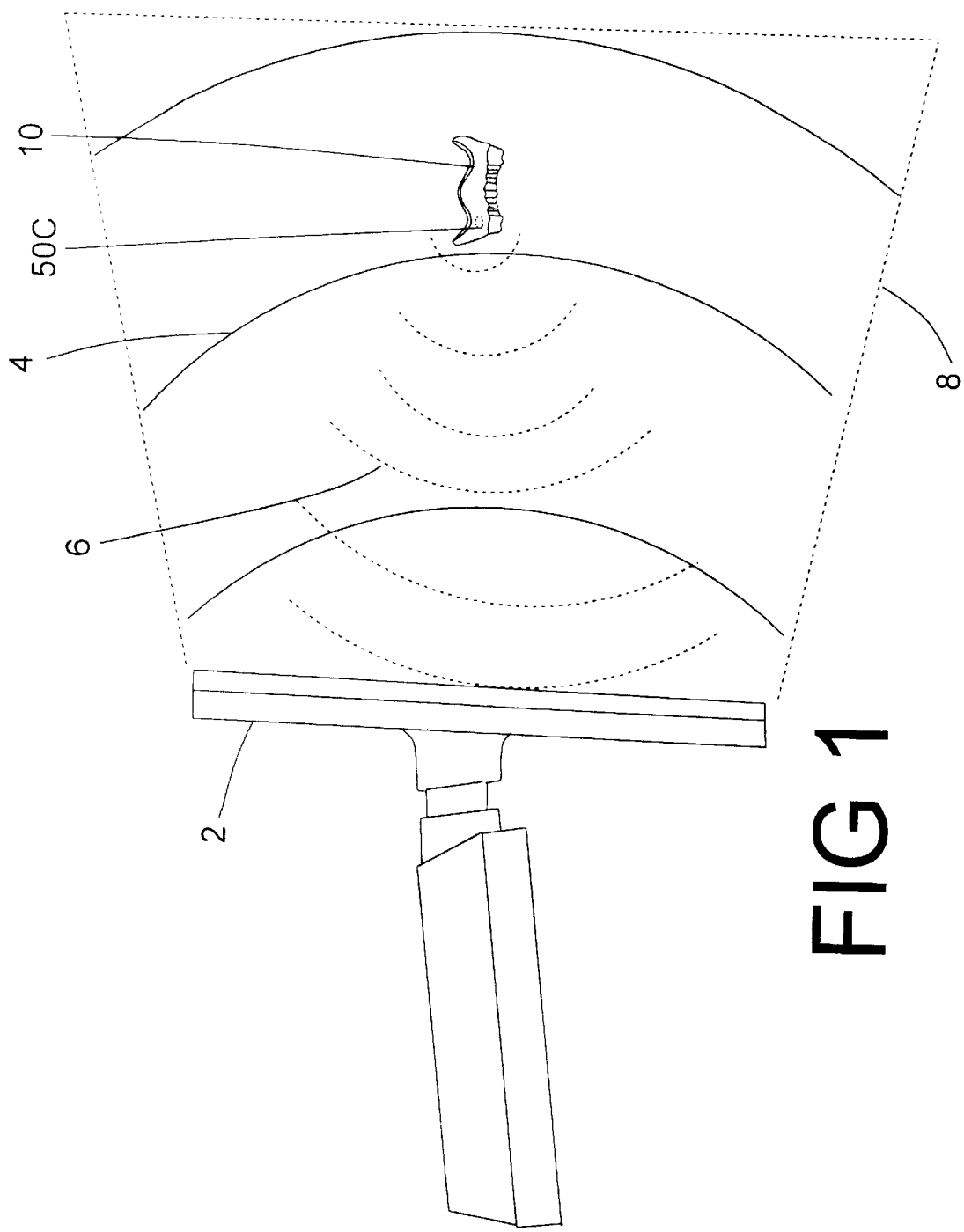
FIG. 1 is a schematic view of a portable detection unit that would be used to locate a lost denture which includes a device emitting a signal in response to a field transmitted by the detection unit.

FIG. 1 is a schematic view showing basic components of a system for locating a denture that has been lost by a patient confined to a medical institution. This system includes a transmitter-detector unit 2 which is capable of identifying a signaling device, here represented by device 50C, that is mounted on or included in the denture 10. In this representative embodiment, the transmitter-detector 2 emits an electromagnetic field or excitation field, represented by wave fronts 4, which impinges upon the signaling device 50C. The signaling device contains an internal component that is activated by the external electromagnetic field 4 and emits a signal, represented by return wave front 6 which is in turn detected by the detection circuit in the transmitter-detector 2. The strength of the excitation field 4 and the sensitivity of the signaling device 50C are chosen so that the lost denture 10 can be detected if the denture 10 is within a specified interrogation zone, represented by the boundary 8. Preferably this interrogation field has a radius of approximately three feet from the transmitter-detector unit 2 so that a suitable large area can be searched while still keeping the search area small enough to permit an effective search once the lost denture 10 has been detected within the search area. Although a search area having a radius of at least three feet is desirable, this invention is also applicable to systems having either larger or smaller search areas or interrogation zones. Portable transmitter detector units with an even more limited range can be employed in a system that also employs stationary detector units. The stationary detector units can be used to monitor areas through which lost denture might be expected to pass, such as an exit to a garbage collection area. The portable units, even with very limited range, can be used to search specific areas, such as a room or closet, where the denture wearer has recently been.

The preferred embodiment employs a passive signaling device 50 that emits a detectable signal only when subjected to a transmitted excitation field 4. Preferably this passive signaling device 50 does not include its own energy source, such as a battery, because a battery will increase the size of the passive signaling device 50 and a battery will have a finite life. In many cases a relative long time elapses between attachment of the signaling device 50 to the denture or incorporation of the signaling device 50 in the denture and the first time that the denture cannot be located. There may however be certain limited applications in which an active signaling device could be employed.

The transmitter-detector 2 depicted in FIG. 1 is intended to be a portable device that can be used to search several areas, such as different rooms in a medical institution. It should, however, be understood that stationary transmitter-detector units 2 would also be useful. For instance in a long term care facility a stationary unit could be located at the entrances and exits to a dining facility, in laundry areas, in a trash disposal facility and near dishwashing facilities. When used in such applications the transmitter-detector units 2 should be activated only at certain times. For instance, when used in a dining area, the transmitter-detector 2 would be activated only when dishes and trays, where lost dentures 10 could likely be inadvertently placed, are removed from the dining area. This capability would limit false alarms as patients wearing dentures enter and exit the dining area. The transmitter-detector 2 is also not limited to devices in which both the transmitter and the detector are located within the same physical structure. Separate transmitter and detection units could also be employed. For example a transmitter could be located on one side of a doorway and the detector could be place on the opposite side. For portable units, one of two separate units could be located at one point while the other unit would be moved in a circle around the unit that is not moved. FIG. 1 shows only a single denture within the interrogation zone 8. However in many cases, both the upper and lower denture would be lost and by including signaling devices or locators or both dentures, the overall size of the locator could be greater than would be practical for a single locator of a size suitable for one denture, and therefore for some detection technologies, the size of the interrogation zone or search area could be increased.

Although signaling devices 50 could be embedded in a dentures when they are initially fabricated, the typical use of this system will be to detect previously fabricated dentures. This is especially true because the most frequent application of this device will be in a medical care facility, and most denture wearers will be fitted with artificial dentures long prior to entry into such a facility. FIGS. 2–7 show areas in which signaling devices 50 can be mounted on or encapsulated in either a maxillary or upper dentures 10 or mandibular or lower dentures 20.

Figure 2:
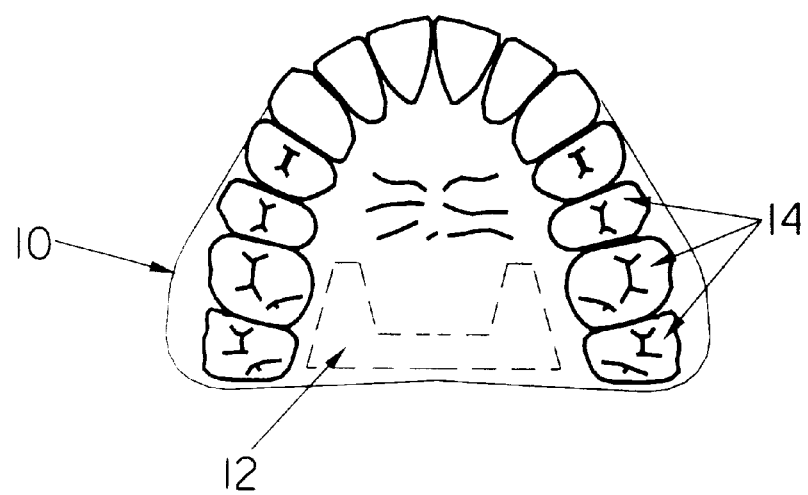
FIG. 2 is a view of the interior of a maxillary or upper denture showing an area in which a device can be mounted without adverse effects on the user's oral cavity or tongue.

FIG. 2 shows the lower or exposed area of a maxillary denture 10. The area 12 outlined at the rear of the denture 10 is located in the palatal vault area of the upper denture 10. If a signaling device 50 is mounted in this area, it will not irritate the oral cavity or the tongue of the denture wearer, provided that the signaling device 50 is not too thick and does not protrude substantially from the adjacent surface of the palatal vault area. A locator or signaling device 50 positioned within this area could have different shapes.

Figure 3:
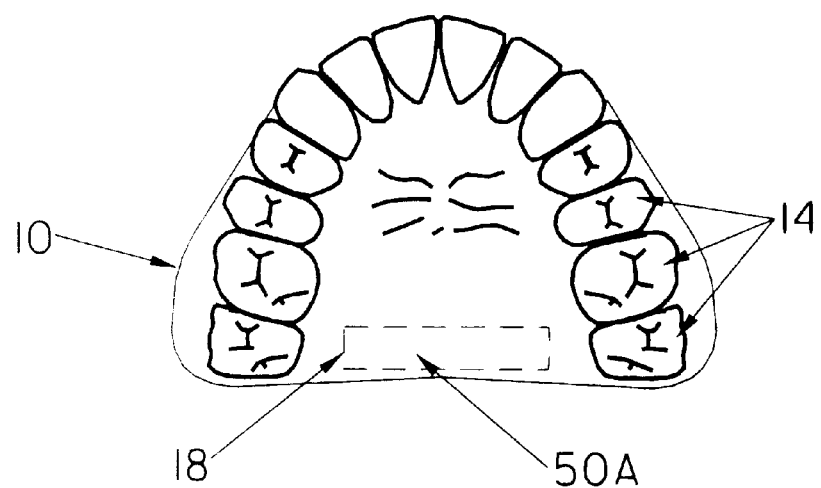
FIG. 3 is a view of a representative passive device mounted in the palatal vault of a maxillary denture.
Figure 4A:
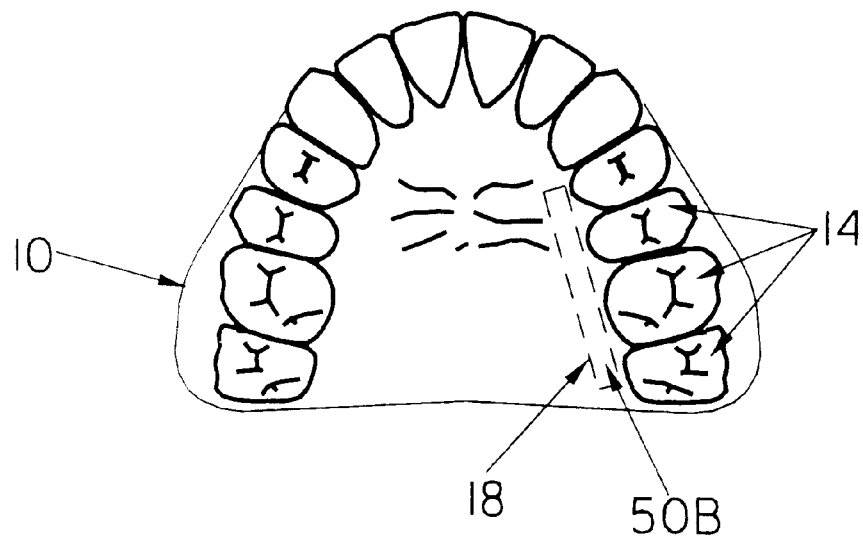
FIGS. 4A and 4B are views of another location in which another representative passive device can be located on the interior of the lingual flange area of a maxillary or upper denture.
Figure 4B:
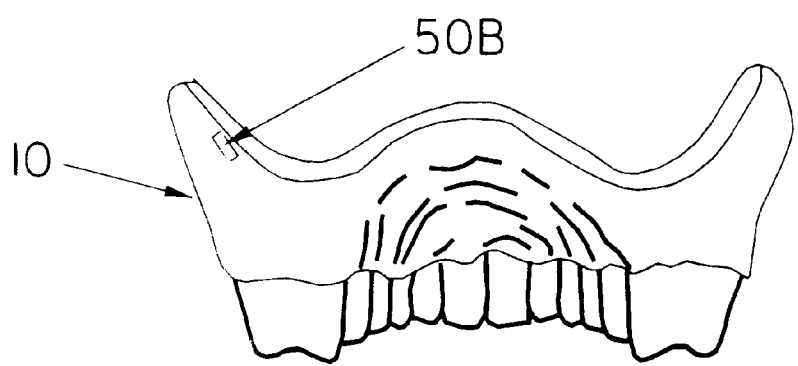

A signaling device 50A in the form of a button or insert having dimension of 3 mm×8 mm×40 mm could be located adjacent to and along the rear edge of the palatal vault area of the maxillary denture 10 in the manner shown in FIG. 3. This area would extend generally between the rearmost molars 14 on this upper denture 10. The thickness of this locator 50A would be less than the local thickness of the denture where the locator would be positioned. FIGS. 4A and 4B shows a signaling device 50B located along the interior lingual flange on one side of the maxillary denture 14. A signaling device 50B could also be located on the opposite side of the palatal vault area. A signaling device 50B having the dimensions of 7 mm×20 mm×2 mm could be located in this area. A device 50B located in this area could would be located along a flat surface of the posterior palate, but signaling device 50B cannot be allowed to intrude in the normal space for the dorsal side of the tongue and signaling device 50B cannot penetrate the palatal surface since this would cause irritation of the dense palatal tissue of the denture wearer. Both buttons 50A and 50B are shaped so that the exposed surface generally conforms to the local surface 18 of the denture 10, so that the button 50A can be firmly affixed to the denture without protruding too far into the denture wearer's oral cavity.

Figure 5A:
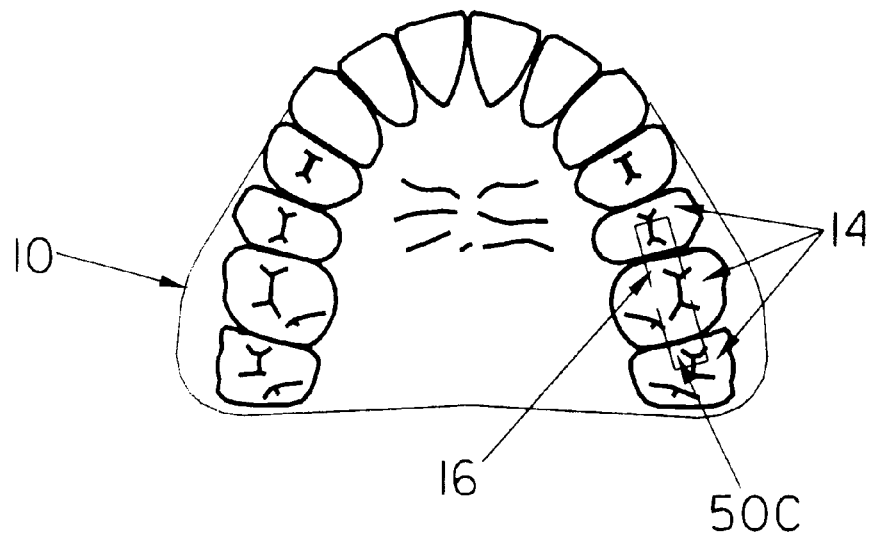
FIGS. 5A and 5B are views of a cavity that can be located below the molar teeth area of a maxillary denture, and which can provide space for a representative passive signaling device.
Figure 5B:
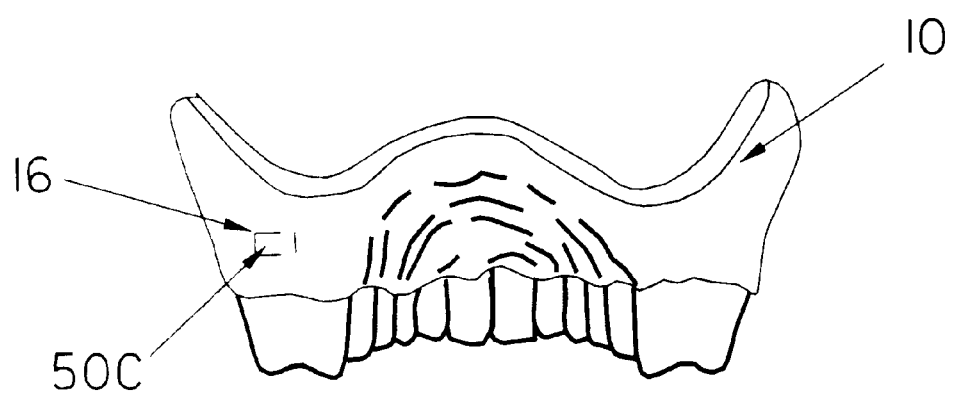

An alternative location for a signaling device 50 in the form of a button or insert is shown in FIGS. 5A and 5B where a signaling device 50C is located between the molar teeth and the gum surface of the maxillary denture. This location would be especially suitable for a denture in which the signaling device is positioned in the denture when the denture is initially manufactured in a dental lab.

Figure 6A:
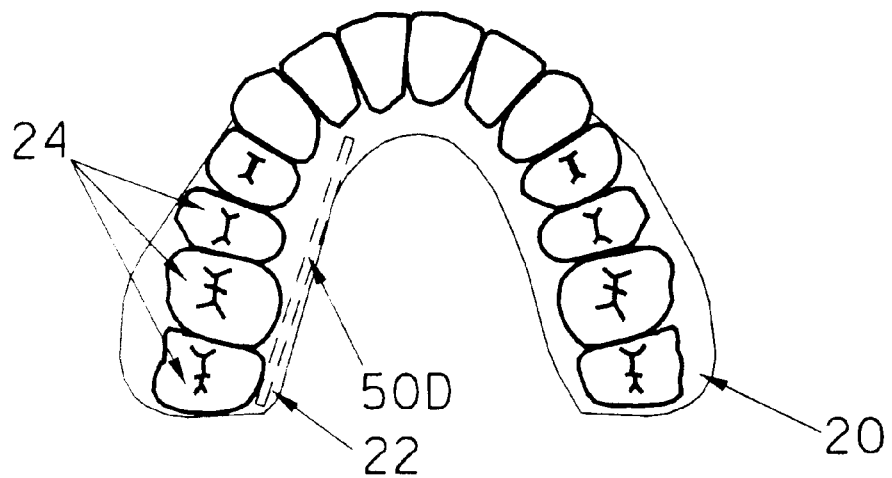
FIGS. 6A and 6B are views of a representative device located on the lingual flange area of a mandibular or lower denture.
Figure 6B:
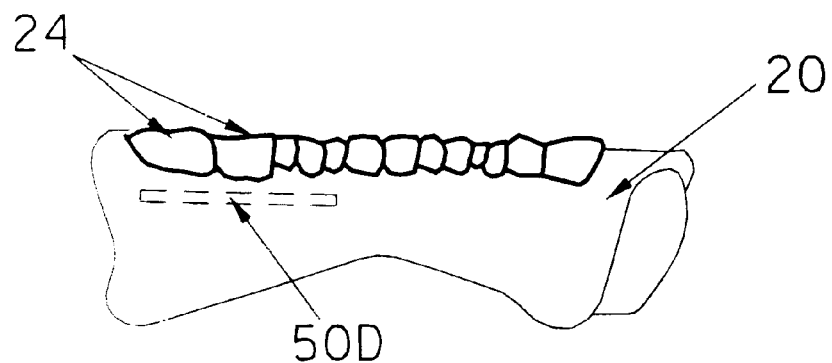
Figure 7:
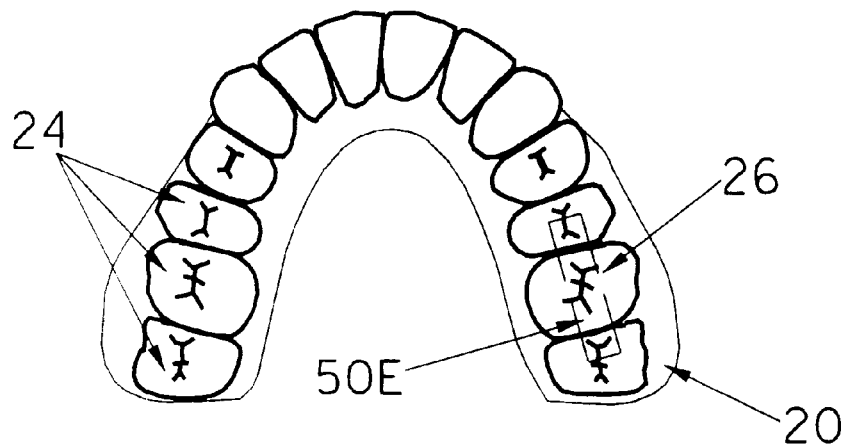
FIG. 7 is a view of a cavity in the molar teeth area of a mandibular denture in which a representative device responsive to an interrogation field can be located.
Figure 8:
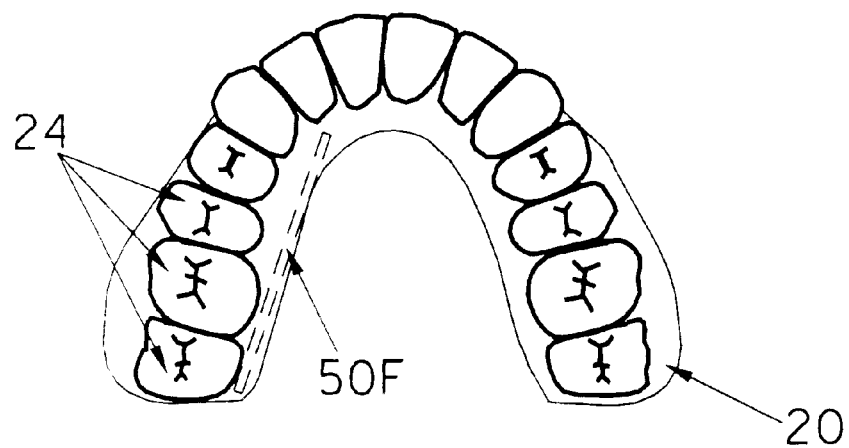
FIG. 8 is a view of another signaling device that can be mounted along one side of the lower denture.

Signaling devices can also be mounted on a mandibular or lower denture 20 as shown in FIGS. 6–8. The device 50D, shown in FIGS. 6A and 6B, is positioned on the lingual surface of the flange of the mandibular denture 20 in the base portion of the denture below the teeth.

FIG. 7 is another view of a button 50E located on the lower denture 20. This button 50E is located within a molar cavity 26 formed between lower molars 24 on one side of the denture 20 and the gum surface of the denture. As with the configuration shown in FIGS. 5A and 5B, material is removed from the denture behind the molars 24 to form the cavity 26. The signaling device 50E is then placed in the cavity 26 and a previously fabricated mold is used to restore the exterior surface of the molars 26.

FIG. 8 shows a third zone in which a signaling button 50F can be mounted on the lingual surface of the flange of the mandibular denture 20. It can be seen that the signaling button 50F is longer than the signaling button 50D shown in FIGS. 6A and 6B. FIG. 8 shows that some material can be removed from the lingual flange of the mandibular denture adjacent the front of the denture so that the button 50F will not protrude form the inner surface of the front denture at this location causing discomfort to the denture wearer.

Figure 9:
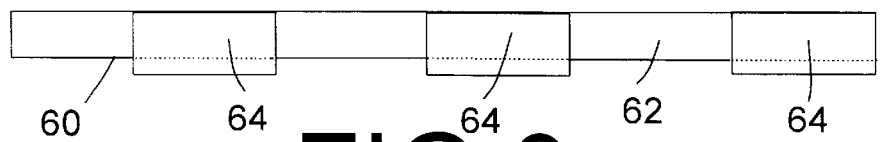
FIG. 9 is a view of a passive signaling device including a magnetic strip whose presence can be detected by its response to variations in an external electromagnetic field, and also includes a number of other magnetic elements that can be used to deactivate the primary magnetic strip.

FIG. 9 shows a passive magnetic strip 60 that is used in the preferred embodiment of this invention. These magnetic strips are commercially available from Sentry Technology Corporation and its subsidiary Knogo North America, Inc. and are referred to as Micro Magnetic strips. Micro Magnetic is believed to be a trademark of Sentry Technology Corporation. The magnetic strip 60 comprises two layers. The first layer 62 is a continuous thin strip formed from a soft magnetic material that has a relatively low coercivity so that the magnetic state of this strip 60 can be changed by the alternating magnetic field imposed by the varying electromagnetic field emitted by the transmitters in the transmitter-detector units. The second overlapping layer comprises a series of segments 64 that are formed from a second material that can occupy two different magnetic states. In one state, the low coercivity magnetic strip 62 is unaffected by the segments 64. When the segments 64 are in a second magnetic state, the magnetic field exerted by the segments 64 effectively prevents any changes in the magnetic state of the strip 62. Since the magnetic state of the strip 62 remains constant, no detectable signals are emitted by the strip 62 in response to a varying magnetic field to which the magnetic strip 60 is subjected. In one version of magnetic strips of this general type, the segments 64 can be magnetized so that the magnetic field exerted by the segments 64 is larger than the peak magnetic field exerted by the incident electromagnetic field on the strip 60. Thus the incident magnetic field is not strong enough to change the state of the soft magnetic material in strip 62. In alternative magnetic devices of this type, the magnetic field exerted by the second segments or strips on the variable magnetic strip, will bias the primary magnetic strip so that a distinctive response will be generated.

The segments 64 can be activated and deactivated by a separate apparatus that can be used to change the magnetic state of the segments 64 between an active and an inactive state. Typically the segments would be placed in a state corresponding to a device inactive state when the denture wearer would not be residing in a medical care facility to prevent inadvertent activation of transmitter-detector units that might be used for other purposes. The magnetic device 60 would be activated when the denture wearer is in a health care institution equipped with transmitter detector units to prevent inadvertent loss by the denture wearer. A system of this type would therefore permit installation of a signaling device 50 in a denture before the denture wearer moves to a health care facility.

There are a number of different materials that can be employed to fabricate the magnetic strip 62, or their equivalents, and the secondary segments 64, or their equivalents. Permalloy is one material that has been used for the primary magnetic strip, such as strip 62. Other similar strips use a material marketed by Allied Signal or Honeywell under the trademark Metglas. U.S. Pat. No. 5,029,291 discloses a cobalt alloy that can exhibit an asymmetric hysteresis characteristic and the response can be detected when subjected to a variable incident magnetic field. One material that can be used to form the segments 64 is iron oxide. Other material for fabricating magnetic detector strips of this type are also known to those of ordinary skill in the art.

Figure 10A:
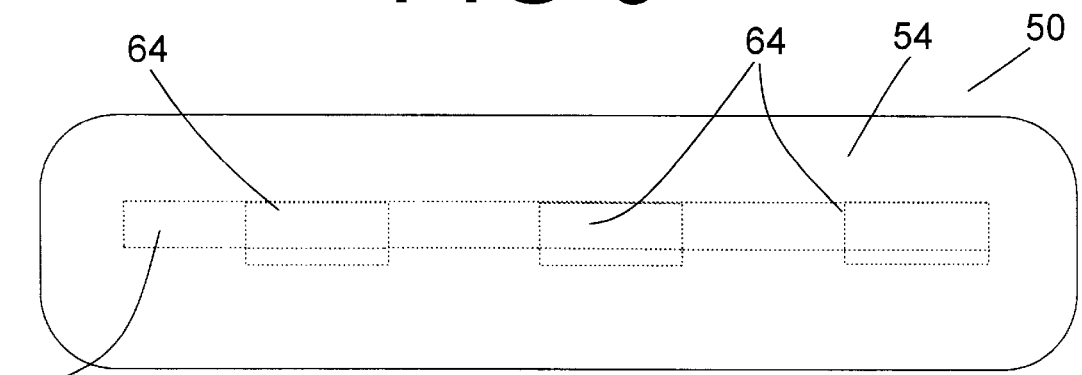
FIGS. 10A, 10B, and 10C are views showing the exterior of a representative insert or button that would be placed on a preexisting denture.
Figure 10B:
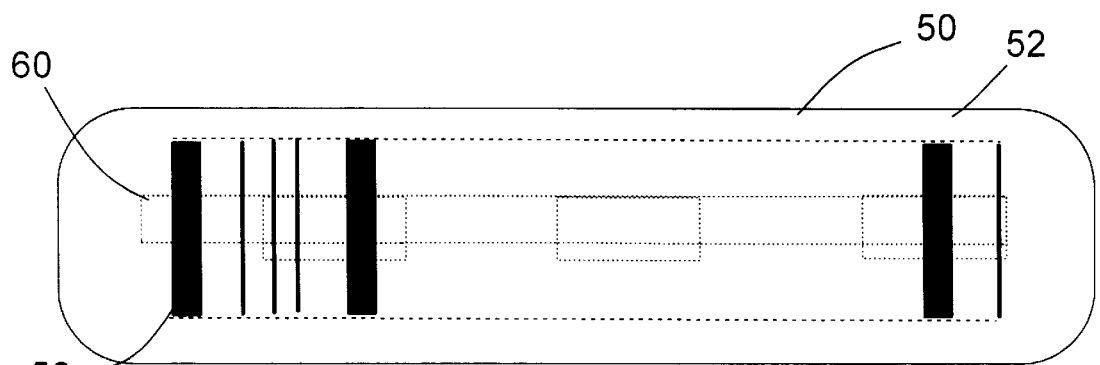

FIGS. 10A throught 10B show a dental locator strip 50 that employs the magnetic strip 60. The dental locator strip 50 includes a resin layer that encapsulates the magnetic locator strip 60 to protect both the denture wearer form the magnetic locator strip 60 and the strip form the acids or other contaminates that may be present in the denture wearer's oral cavity of from fluids that may be used to clean the denture. The resin used in the dental locator 50 can comprise a resin of the type typically used in dentures. The preferred embodiment of this invention employs methyl methacrylate as the resin surrounding the magnetic locator strip 60. The methyl methacrylate also serves to bond the dental locator 50 to the denture. An alternate material is (2-2-bis(4(2-hydroxy-3-methacryloyloxy propoxy) phenyl) propane, commonly referred to as bis-GMA. Neither of these resins is ferromagnetic and the electromagnetic field can penetrate either resin so that the magnetic strip 60 will still be subjected to the incident variable electromagnetic field.

Figure 10C:
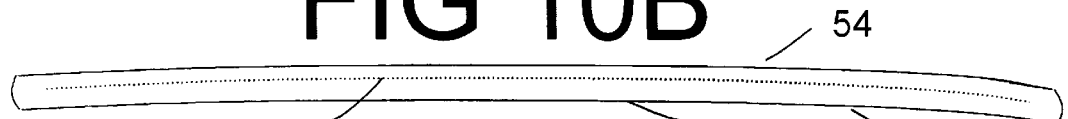

The interior side 54 of the dental locator strip 50, shown in FIG. 10A would either have a generally rough texture, or would be roughened prior to attachment to the denture so that the resin can be bonded to the denture. FIG. 10B shows the exterior smooth surface 52 of the dental locator 50 that will be exposed when the dental locator is bonded to the denture. This surface 62 will have a contour that will confirm to the local contour of the denture to which the dental locator 50 will be bonded. FIG. 10C shows that the exterior surface 52 will have a generally concave contour, although the precise shape of each dental locator 50 will conform to the local contour of the individual denture. The manner in which this shape is formed will be subsequently discussed in greater detail.

The exterior surface 52 of dental locator 50 also includes a visible indicia that will enable a lost denture to be identified when found. A representative bar code 58 is visible on surface 52. This bar code 58 will serve as a unique identifier for both the denture and the denture wearer so that a lost denture can be returned to its owner. In the preferred embodiment of the system of which each dental locator 50 is a part, a central database, including all dentures and denture owners, will be maintained. Of course individual databases could also be maintained at each health care institution.

Irrespective of the type of signaling component used in the signaling device 50, the device can be mounted on an exposed surface of an existing denture in the same manner. First the dental surface to which the signaling button 50 is to be attached is to be cleaned and sterilized. A groove or trench is then cut into the denture. This groove or trench is large enough to at least partially insert the dental locator 50 so that the exposed surface 52 will be substantially flush with the local contour of the denture when bonded to the denture. The surface of the locator zone or trench must then be primed with a liquid monomer of the acrylic that is used to encapsulate the dental locator strip. In most cases the material encapsulating the internal component will be methyl methacrylate, which is available as a liquid monomer and as a polymer powder. A liquid paste of monomer and polymer of the acrylic resin of the denture base and the capsule will be applied to the prepared denture and the previously roughened surface 54 of the dental locator strip 50. The dental locator will then be placed in the prepared zone and cured and finished in a smooth and polished surface in accordance with standard denture finishing procedures. Dentures and dental locators fabricated from methyl methacrylate can be cured in hot water and a chemical bond will be formed between the denture and the button. The button 50 will then be permanently bonded to an external surface of the denture in a location where the denture will not excessively protrude from the surrounding contour of the denture and will not cause discomfort to the denture wearer.

The visible mark, such as the bar code 58, shown in FIG. 10A can be used to identify the owner of each denture after it is found. Such a unique mark can be stored on a computer stored and accessible database which could include information in addition to the identify of the owner. Such an approach would permit entry of information to the database in a manner that the personnel at a medical institution would find familiar and would not require an special procedure for encoding an integrated circuit component or other codeable component. If such information is stored on a computer accessible database, that information can be made available to other institutions. For example if the database is accessible via the INTERNET or via a similar network, other institutions can easily access the information. For example if a nursing home patient is transferred to a hospital, where the denture is lost, the hospital can access data entered at the nursing home to identify the owner of a lost denture after it is found. Furthermore the database can include information that would permit a dentist to fabricate a new denture if the original is damaged beyond repair.

A transmitter and detector unit or assembly that can be used to locate a lost denture can also be used to locate other items on which a compatible locator is positioned. For example. a locator can be placed on eyeglasses and hearing aids. Positioning a locator on these other devices poses fewer difficulties than location a button on an existing denture. A transmitter and detector unit emitting an alternating electromagnetic field an also cause interference on hearing aids when positioned close to the hearing aid, causing the hearing aid to emit an audible sound. Although normally this interference can be a problem, in the case of a lost hearing aid, this interference will be a benefit.

FIGS. 12A–C show the manner in which the marker element 100 can be embedded in methyl methacrylate, a material suitable for use in a denture without adversely affecting the mechanical vibration of the magnetomechanical target, especially a magnetic strip exhibiting vibrations due to the Barkhausen effect. The first step in this example is to deposit a first layer 102 methyl methacrylate by mixing a liquid monomer with a polymer powder which are mixed in accordance conventional dental procedures. The layer can be deposited in a mold or on a surface or sheet having the same contour as the denture surface on which this signaling device or locator 110 is to be mounted. This layer is deposited in a concentration such that the methyl methacrylate has a soupy consistency. After the first layer of methyl methacrylate is deposited, the target 100 is positioned on the upper surface of this lower layer 102. The lower layer 102 extends beyond the marker 100 on all four lateral sides of the marker 100. The next step in this process is to deposit an upper layer 104 of methyl methacrylate on top of the marker 100. This upper layer 104 can be formed in the same manner as the lower layer 102 by mixing the liquid monomer with the liquid polymer. The upper layer 104 can be initially deposited on a second surface having a shape that will conform to the shape of the lower layer 102. The upper layer 104 is then positioned on top of the marker 110 and in contact with the lower layer 102. The upper layer 104 completely covers the upper surface of the marker 100 and extends beyond it on all sides. The upper layer 104 is also in contact with the lower layer 102 on all four sides so that the upper layer 104 can bond to the lower layer 102 on all four sides. The marker 100 will then be completely isolated, and will not come into contact with the oral cavity of the denture wearer when the locator element 110 is mounted on a denture.

The next step, illustrated in FIG. 12B is to apply pressure to the composite structure before the two layers 102 and 104 of methyl methacrylate polymerize to form a solid structure. Note that some of the methyl methacrylate material is permitted to laterally extrude as the composite structure is flattened and its thickness reduced. It has been demonstrated that a locator element or button 110 having a thickness of 1.30 mm (0.0510 inch) can be fabricated in this manner. The polymerization reaction between the liquid monomer and the power polymer, the constituents from which the methyl methacrylate structure is formed, will continue for both the upper layer 104 and the lower layer 102 until the composite structure solidifies.

Even though the fully polymerized methyl methacrylate in its solid form completely surrounds the magnetic marker, the magnetomechanical material 108 can still vibrate about its resonate frequency because a gap or channel 112 separating the magnetic material 108 from the solid layers 102 and 104 can be formed as illustrated in FIG. 12C. As the polymerization of the methyl methacrylate is completed and it solidifies, the methyl methacrylate will shrink due to the volumetric contraction which occurs during this reaction. The volume of solid polymer methacrylate material is less than the volume of the constituent liquid monomer and powder polymer that form this material. Thus the methyl methacrylate material will tend to shrink away from the embedded target 100 forming the gaps 112, because the methyl methacrylate will not adhere to the plastic material surrounding the magnetic material 108. The size of these gaps or channels 112 is not shown to scale in FIG. C, which is intended to be a schematic illustration only. The two layers 102 and 104 surrounding the strip 100 will not shrink away from each other or separate because they will form a bond as the material cures. In this manner, the strip 100 can be surrounded by a material that is suitable for use in a denture, but the vibration of the magnetomechanical material will not be adversely affected. This approach is believed to be of special importance with magnetic strips in which large mechanical stresses are induced in the magnetic material to enhance the detectable signal.

After the composite structure of the locator or signaling device 110 is formed in this manner, the outer resin layer can be trimmed to size. When installed in a denture, one exterior surface of the composite structure will be roughened and more liquid methyl methacrylate will be applied to bond the signaling device 110 to an exterior surface of the existing denture. Alternatively a roughened surface on a surface of one of the two layers can be formed by depositing the liquid and powder constituent materials on an external surface or in a mold having a roughened contour. Although the preferred embodiment depicted in this example is flat, it should be understood that the composite signaling device can be formed with a curvature that is suitable for securing the device 110 to the contour of a surface of the denture.

Figure 11:
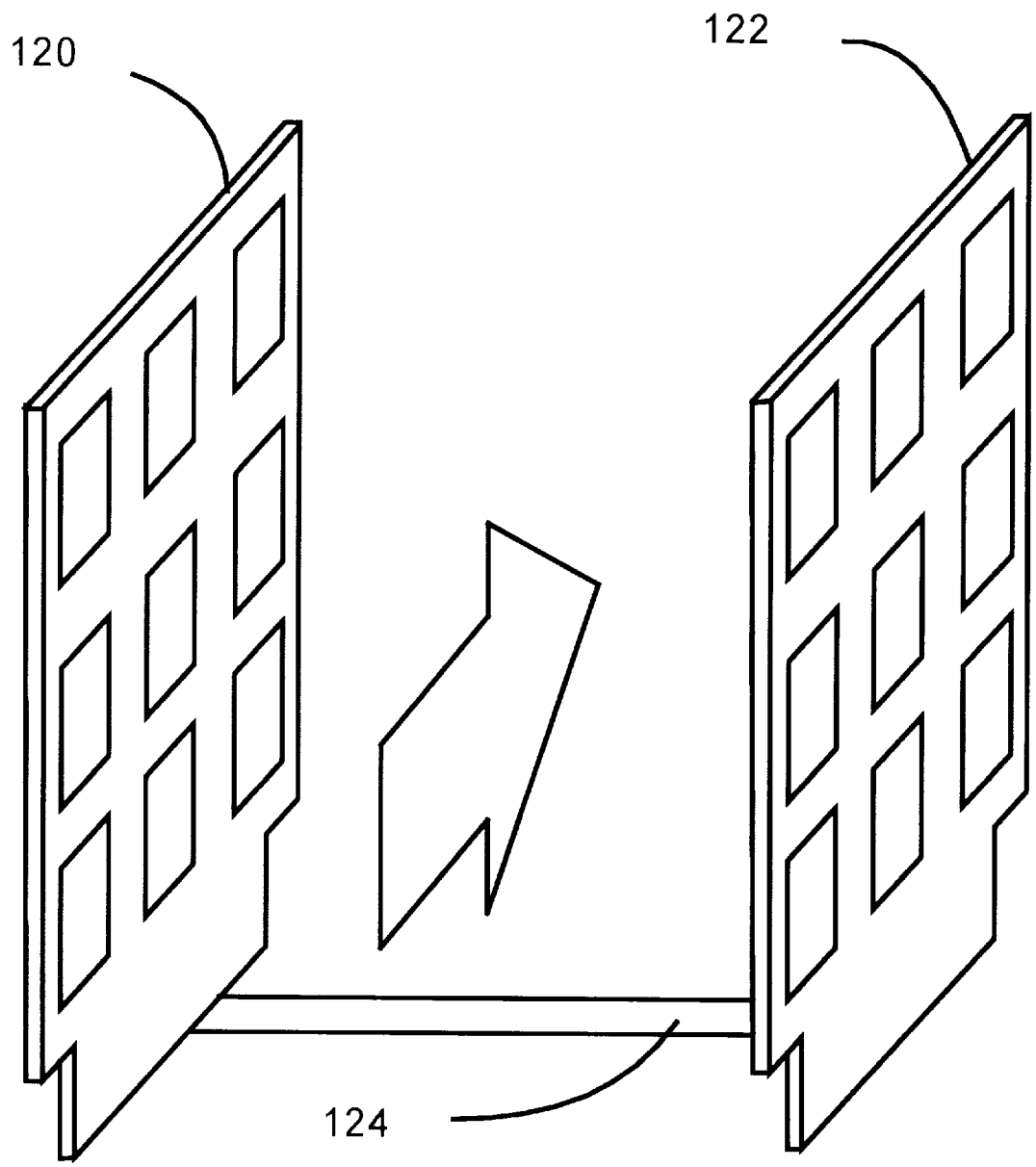
FIG. 11 is a view of two stationery transmitter-detector units that can be placed adjacent a trash or laundry facility or adjacent a door or entry into a trash or laundry area.

FIG. 11 shows stationery transmitter-detector units 120 and 122 that can be used to detect the strips 100 or 110. These stationery transmitter-detector units 120 and 122 are commercially available from Sentry Technology Corporation, and its subsidiary Knogo North America, Inc. and are referred to as Knoscape Micro Magnetic detection panels. Knoscape and Micro Magnetic are trademarks of Sentry Technology Corporation. Each of the transmitter-detector units 120 and 122 are both transmitters and detectors and can be positioned adjacent to a door or entry into a trash or laundry facility or area or any other area where dentures might be inadvertently lost. These transmitter-detector units can also be located adjacent to the trash receptacle or to the laundry apparatus. Two transmitter-detector units 120 and 122 of this type can be positioned at least three feet apart and they are joined by a low power cable 124. One of the units is attached to a standard electrical outlet, and an electronics box, not shown, containing suitable detection circuitry will be connected to the transmitter-detector units which serve as antennas. It has been found that denture units with targets 100 can be detected when large trash receptacles are rolled between transmitter-detector units 120, 122. Denture units with targets 100 attached can also be detected when a box containing the denture unit is thrown between the units 120, 122.

The embodiments depicted herein are representative of other equivalent embodiments that would also be within the scope defined by the following claims, and the representative embodiments are not intended to show the only configurations that should be considered within the scope of this invention. For example, the magnetic locator used in the dental locator is only one of several versions of a magnetic locator that will respond to an external excitation field. Furthermore, this invention in its broadest aspects if not limited to the use of a magnetic locator element. For example a resonant LC circuit element could be substituted for the magnetic locator, although size does represent a problem when the resonant LC circuit element is used and the incident electromagnetic field may need to be stronger while the detector circuitry used with an LC circuit element may need to be more sensitive. The magnetic locator disclosed as the preferred embodiment represents a viable compromise between size, sensitivity and cost. Furthermore, more than one of the thin magnetic markers or locators can be encapsulated in the same resin outer layer to improve detection of the dental locators and the dentures to which they are bonded. These magnetic locators are also suitable for use with other prosthetic devices, such as eyeglasses and hearing aids which might also be lost in a health care institution.

I claim:

1. A system for locating an artificial denture lost within an medical care institution comprising:

a passive device responsive to an excitation electromagnetic field, the passive device being mounted on the artificial denture, the passive device comprising means for emitting an electronically detectable signal in the presence of the excitation electromagnetic field, the passive device being encapsulated in a denture material that is transparent to the excitation electromagnetic field with the denture material isolating the passive device from contact with the oral cavity of a wearer of the artificial denture;

a transmitter for transmitting the excitation electromagnetic field;

a receiver for detecting the signal emitted by the passive device in the presence of the excitation electromagnetic field so that the lost artificial denture can be located within a zone with a detectable range of the receiver, and computing means configured as a database cross referencing specific dentures with patients in the medical care institution who own the specific denture.

2. The system of claim 1 wherein the passive device is embedded in the lost artificial denture.

3. The system of claim 1 wherein the passive device is embedded in a separate insert bonded to the artificial denture.

4. The system of claim 1 wherein a visible indicia is located on the exterior of the passive device so that the visible indicia can be used to identify a specific lost denture detected by the system.

5. The system of claim 4 the computer database includes a cross reference between various visible indicia and all of the dentures of patients within the medical care institution so that the owner of a lost denture can be identified.

6. The system of claim 4 wherein the visible indicia includes a bar code and the system includes a bar code reader and a database accessible by the bar code reader to identify the owner of a specific lost denture.

7. A method of mounting a button including signaling component encapsulated in an acrylic on a preexisting denture, so that the signaling component emits a signal when subjected to an interrogation field to permit the denture to be located if lost, the method comprising the steps of:

roughening the surface of a portion of the denture on which the signaling device is to be mounted;

priming the roughened surface with a liquid monomer of the acrylic encapsulating the signaling component;

applying a liquid monomer and polymer acrylic paste of which the denture is formed and which encapsulates the signaling component to both the denture and the button;

positioning the button on the previously roughened surface;

curing the paste; and finishing the external surface to form a smooth, polished dental surface.

8. A signaling device responsive to an external electromagnetic field and suitable for mounting on a surface of a denture in which the signaling device comprises a magnetomechanical sensor element disposed within a solid resin which is bondable to a surface of the denture and is suitable for introduction into an oral cavity of a human, the magnetomechanical sensor element being disposed in an internal channel within the solid resin so that the magnetomechanical sensor element can vibrate in the channel when subjected to the external electromagnetic, wherein the solid resin comprises a solid polymeric resin formed from a liquid monomer and a polymer powder which solidify when combined and which exhibit volumetric contraction during solidification, so that the channel can be formed as the resin material shrinks away from the magnetomechanical sensor element as the resin solidifies.

9. The signaling device of claim 8 wherein the solid resin comprises methyl methacrylate.

10. An artificial denture comprising a teeth portion and a base portion, the artificial denture also including a remotely detectable marker emitting a detectable response when subjected to an incident electromagnetic field, the marker being bonded to the base portion of the denture and covered by an exterior layer isolating the marker from a denture wearer's mouth.

11. The artificial denture of claim 10 wherein the marker comprises a magnetic strip, the magnetic strip having varying magnetic characteristics when subjected to an incident electromagnetic field.

12. The artificial denture of claim 10 wherein the exterior layer comprises a layer formed form a material having substantially the same composition as the base portion of the artificial denture.

13. The artificial denture of claim 12 wherein both the exterior layer and the base portion are formed from methyl metharcylate.

14. The artificial denture of claim 10 wherein the marker is bonded to a lingual flange area of the base portion.

* * * * *